United States Patent [19]

Constant

[11] 4,396,885
[45] Aug. 2, 1983

[54] DEVICE APPLICABLE TO DIRECTION FINDING FOR MEASURING THE RELATIVE ORIENTATION OF TWO BODIES

[75] Inventor: Claude Constant, Paris, France
[73] Assignee: Thomson-CSF, Paris, France
[21] Appl. No.: 156,083
[22] Filed: Jun. 3, 1980
[30] Foreign Application Priority Data
Jun. 6, 1979 [FR] France ............................ 79 14441
[51] Int. Cl.³ ........................ G01B 7/14; G01S 3/02
[52] U.S. Cl. ................................. 324/208; 343/112 R
[58] Field of Search ............................ 324/207, 208; 343/112 R, 112 D, 100 CS; 340/27 NA; 364/444, 449, 559

[56] References Cited
U.S. PATENT DOCUMENTS
4,054,881 10/1977 Raab .................................. 324/244

Primary Examiner—Gerard R. Strecker
Assistant Examiner—Walter E. Snow
Attorney, Agent, or Firm—Cushman, Darby & Cushman

[57] ABSTRACT

A magnetic coupling device in which two assemblies of three coils are attached respectively to two mechanically independent bodies and form a radiator assembly and a sensor assembly. Each assembly defines a cartesian coordinate frame and is associated with a switching circuit controlled so that the radiator coils are excited successively and separately by the same alternating-current wave and so that the sensor coils are connected separately and successively to processing circuits during each excitation stage of a radiator coil. The processing circuits comprise a synchronous demodulator, a coherent integrator and a control loop for reducing the induced signal received to zero and measuring the corresponding field component. This measurement is performed by an ancillary computer which determines the Euler angles.

3 Claims, 5 Drawing Figures

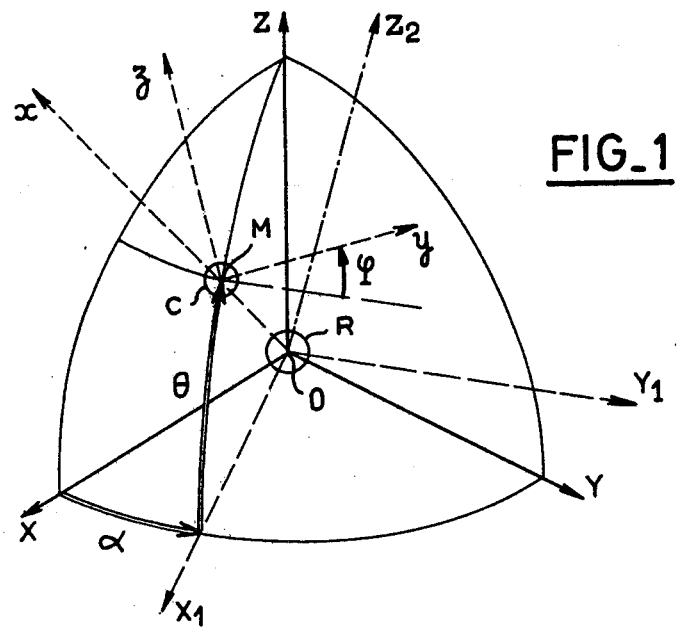
FIG_1
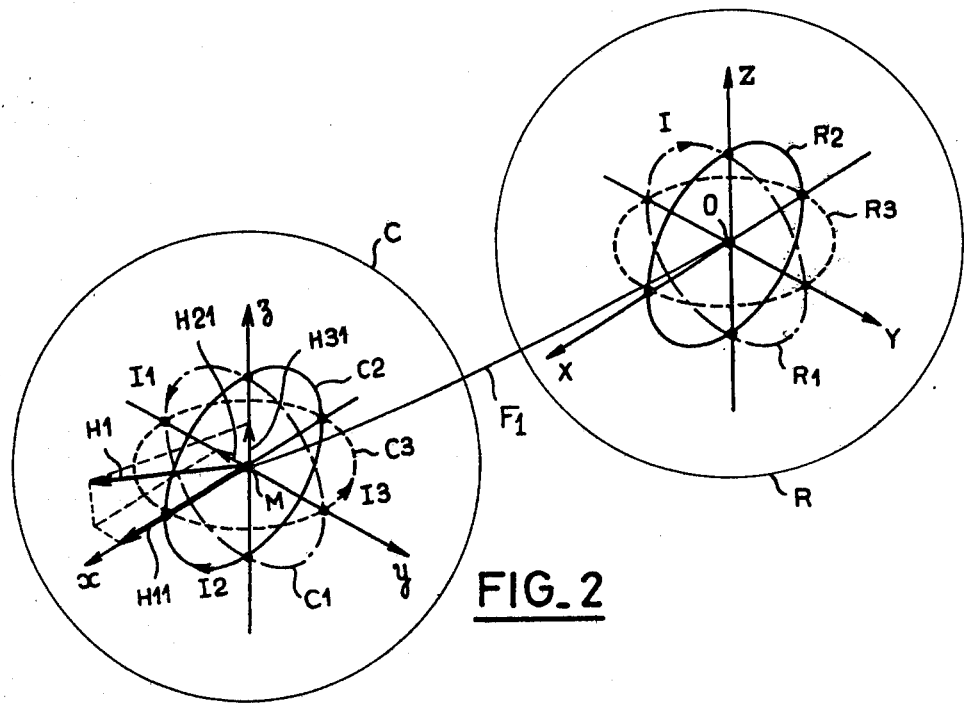
FIG_2

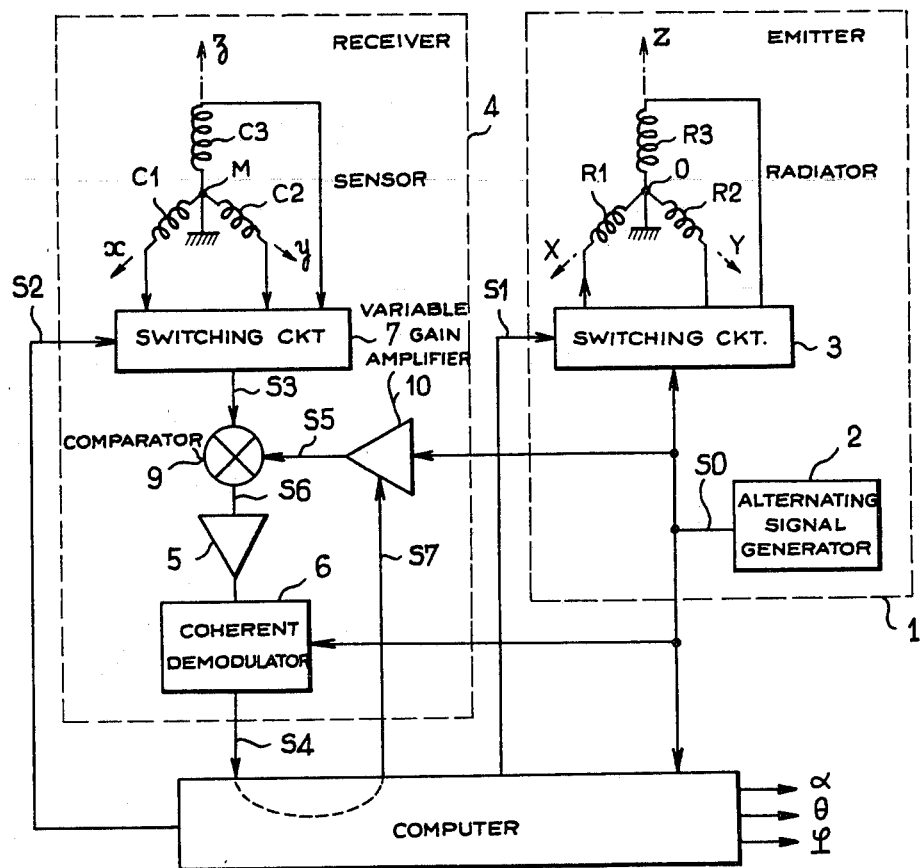
FIG_3
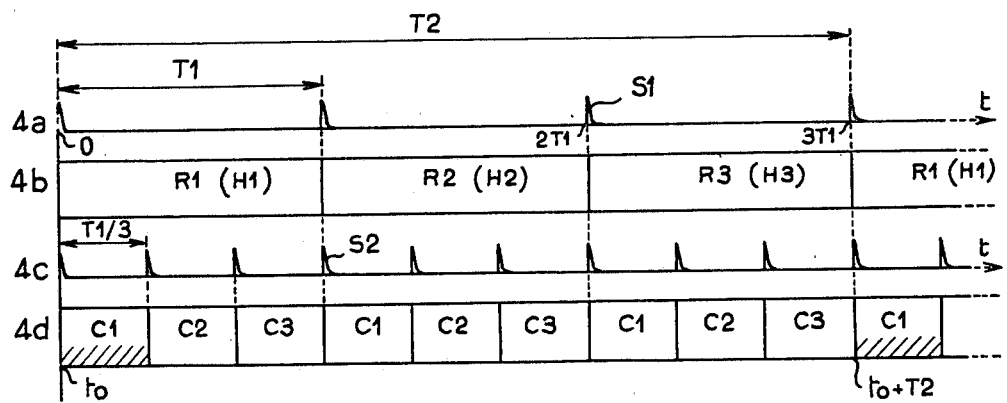
FIG_4

DEVICE APPLICABLE TO DIRECTION FINDING FOR MEASURING THE RELATIVE ORIENTATION OF TWO BODIES

This invention relates to a device for measuring the relative orientation of two bodies, the device being more particularly applicable to direction-finding.

It sometimes proves useful to determine the direction of orientation of an axis with appreciable accuracy but without having any material contact with the axis.

This type of problem is encountered in particular in the helmet visor systems employed in fighter aircraft. The operation of a system of this type will now be recalled briefly. By means of an ancillary collimating device, the pilot sees the image of a reticle through a semi-reflecting mirror which is rigidly fixed to the helmet and is interposed on an axis of monocular vision, the image being projected to infinity in superposition with respect to the external scene.

When the pilot desires to designate a target in the scene under observation, he causes the reticle to coincide with the target and indicates that coincidence is achieved, for example by making use of a push-button control provided for this purpose.

On condition that the exact position of his helmet is located at the moment of target indication, it is then a fairly easy matter to determine the direction of the pilot's line-of-sight with respect to the aircraft and to designate the target to a weapons system or to point an optical system or the like in this direction.

This invention makes it possible to construct a direction-finding system which provides an answer to the problem. The direction to be determined is related to a free structure, the movements of which take place within a predetermined spatial volume. In the particular application which is contemplated, the free structure comprises the pilot's helmet and the volume is defined by the possible ranges of motion of the pilot's head within the cockpit. The direction-finding device comprises a first portion rigidly fixed to the movable structure and a second portion fixed to an external structure (the air-craft in the case under consideration) for measuring the relative angular movements of the movable structure with respect to a system of reference axes associated with the external structure.

Starting from points which are fixed with respect to the aircraft, the locating device thus makes it possible to determine the position of an object carried by the pilot's helmet and then to deduce the line-of-sight direction from this position by computation.

In view of the fact that the helmet is worn by the pilot, that portion of the device which is attached to the helmet must consequently have the minimum weight and bulk while also presenting minimum danger and inertia.

Direction-finding systems exist in different forms; they combine radiating elements or so-called radiators with corresponding receiving elements known as radiation detectors or sensors. A technique based on optical coupling consists in utilizing point sources of light such as electroluminescent diodes and linear photodetector mosaics associated with optical masks.

Another class of system which includes the measuring device according to the invention makes use of magnetic coupling for determining the relative orientation of two cartesian coordinate frames. In a known form of construction described in U.S. Pat. No. 3,868,565, a first coordinate frame constitutes the reference frame and corresponds to the radiator which is rigidly fixed to the aircraft structure whilst a second coordinate frame corresponds to the sensor which is rigidly fixed to the pilot's helmet. Each coordinate frame is defined by means of a set of three coils having axes X, Y and Z respectively. The radiator coils are supplied simultaneously with different excitation alternating-currents so determined as to produce a rotating conical field. The excitation circuit is controlled in dependence on the circuit for receiving information induced in the sensor coils so that the axis of the resulting conical field remains pointed at the sensor. The electronic circuitry for receiving and measuring serves to determine the three Euler angles by means of a computer and said angles define the relative orientation of the coordinate frames.

Control of the emission field in dependence on the position of the sensor introduces in the first place a pointing error which produces uncertainty in the angles to be determined and, in the second place, a limitation of the spatial zone of motion of the sensor.

An object of this invention is to provide an orientation-measuring and direction-finding device which overcomes the disadvantages mentioned in the foregoing and permits simplification of the electronic processing circuitry by dispensing with the emitter control loop.

According to a distinctive feature of the present invention, the measuring device comprises means for generating excitation currents which are supplied successively to the three coils of the radiator via one and the same alternating-current signal consisting of an unmodulated continuous wave. The device further comprises means adapted to process the signals induced in the three coils of the sensor and connected successively at the output of each sensor coil during each stage of supply of a radiator coil in order to process nine signals corresponding to the projections along the sensor coordinate frame of the three successive fields produced by the radiator at the sensor location and to deduce therefrom by means of ancillary computation means the three Euler angles corresponding to the relative orientation of the coordinate frames and consecutively the orientation of an axis associated with the radiator coordinate frame.

Other features of the invention will be more apparent to those skilled in the art upon consideration of the following description and accompanying drawings, wherein:

FIG. 1 is a diagram relating to the Euler angles to be identified;

FIG. 2 is a diagram relating to the method employed in accordance with the invention;

FIG. 3 is a general diagram of an orientation-measuring device or direction-finding system according to the invention;

FIG. 4 shows waveforms and time distribution diagrams relating to the operation of a device according to FIGS. 2 and 3;

Figure 5:
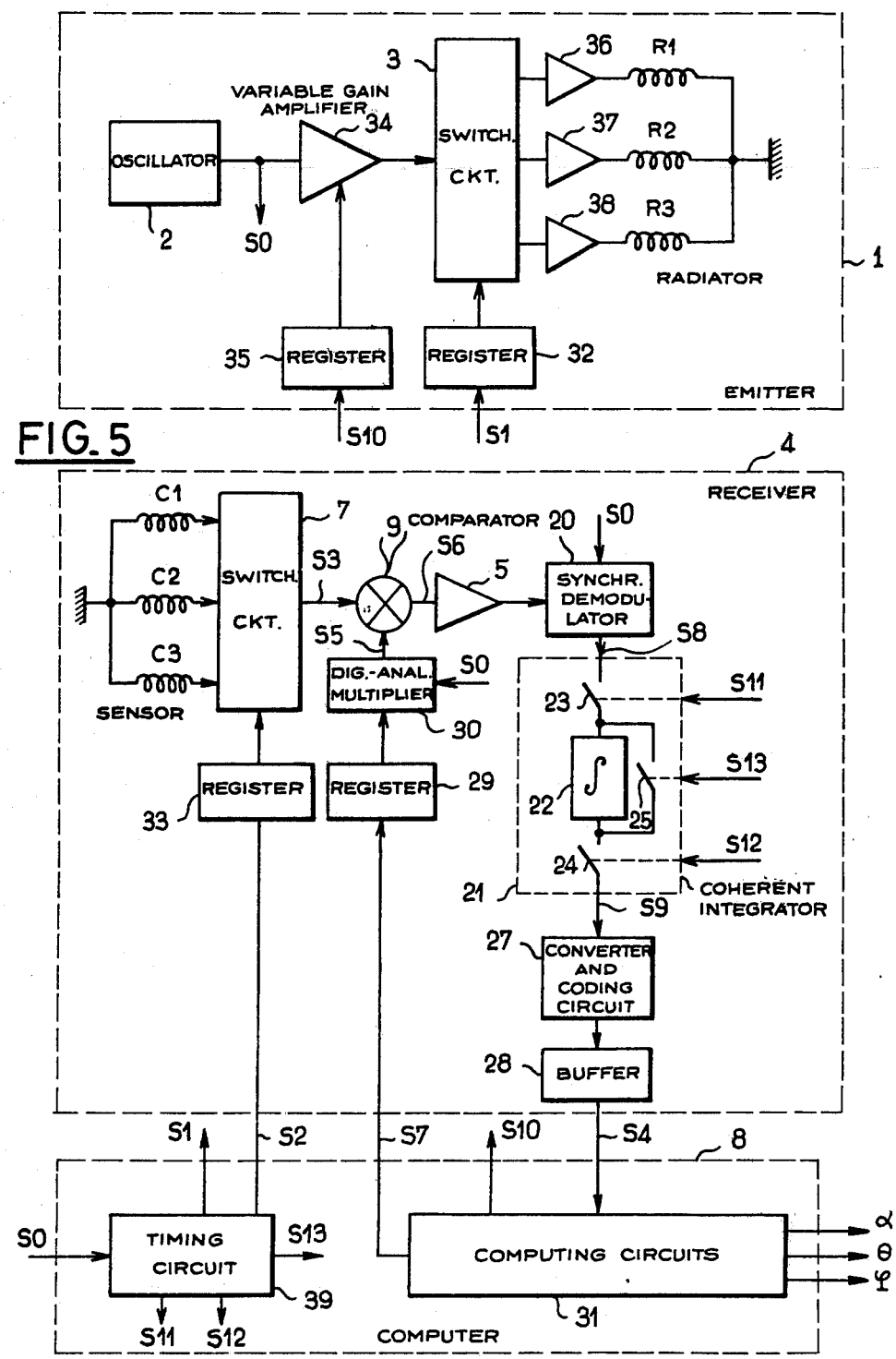

FIG. 5 is a diagram of one example of embodiment of a measuring device according to FIG. 3, Referring first to FIG. 1, the orthogonal axes X, Y and Z represent a reference coordinate frame associated with a first body on which is fixed one of the elements of the measuring device, that is, a radiator R. The orthogonal axes x, y and z represent the coordinate frame associated with the second body on which the other element is fixed, that is, the sensor C. The bodies are mechanically uncoupled, the second body being free to move in translation and/or rotation. Rotational motion is represented by the Euler angles $\alpha$ in azimuth, $\theta$ in elevation, and $\phi$ in rolling motion about the direction to be determined. This direction is advantageously constituted by one of the axes of the coordinate frame x, y, z in order to simplify calculations, namely the axis x in the example shown in the figure. Moreover, in order to simplify the representation, the axis x is considered as passing through the origin O of the reference coordinate frame X, Y, Z. In the application to a helmet visor, the axis X preferably corresponds to the forwardly directed longitudinal axis of the aircraft, the coordinate frame X, Y, Z represents the aircraft, the sensor C is rigidly fixed to the pilot's helmet and x represents the line-of-sight direction to be identified.

FIG. 2 relates to the method employed in accordance with the invention and shows the sets of radiator coils R1, R2 and R3 and sensor coils C1, C2 and C3 which serves to define the respective coordinate frames. Each set consists of three coils. Each coil can be assimilated with a closed loop, the plane of which is orthogonal to the plane of each of the other coils of the set. The coil R1 in the plane ZOY has the axis X, the coil R2 in the plane ZOX has the axis Y and the coil R3 in the plane XOY has the axis Z. The same applies to the coils C1, C2, C3 of the sensor C defining the axes x, y and z. The flow of an excitation current I through the coil R1 of the radiator R produces a field of maximum value along the axis X of the coil. The field H1 produced at the origin M of the sensor coordinate frame x, y, z is tangent to the line of force F1 which passes through the origin M. The field H1 gives rise to induced currents in the sensor coils C1, C2 and C3. The induced currents are proportional to the projections of the field H1 along the axes x, y and z. Thus the current I1 induced in the coil C1 results from the field H11 along the axis x; similarly, the currents I2 and I3 result from the fields H21 and H31 along the axes y and z respectively. The value of the field H1 is proportional to the value of the current I and also varies at $1/d^3$, where d is the distance OM between the coordinate frames. As will be seen hereinafter, the method of measurement utilizes the nine components in order to compute the Euler angles $\alpha$, $\theta$ and $\phi$ and to deduce the line-of-sight direction therefrom.

As shown in the general diagram of FIG. 3, the system comprises a field-emitting portion 1 including the radiator coils R1, R2, R3 and the corresponding supply means consisting of a generator 2 and a switching circuit 3. The circuit receives the generator output S0 via a first input, a control signal S1 via a second input and comprises three outputs for supplying the coils R1 to R3 respectively. The generator 2 can consist of an oscillator; it delivers the signal S0 constituted by an unmodulated continuous wave, for example of the form A sin wt, which is intended to produce the excitation current within the coils. The control signal S1 is a periodic signal as shown in FIG. 4a, for connecting the input S0 to each coil supply output in successive switching operations. The coil R1 is supplied during a first period T1 (FIG. 4b), whereupon the coil R2 is supplied during the second period T1 and, finally, the coil R3 is supplied during a third period; the time-duration of the complete emission cycle is T2=3T1 and is repeated at the period T2.

The receiving portion 4 is constituted by the set of coils C1, C2, C3 of the sensor connected to an amplifying circuit 5 and a processing circuit 6 via a switching circuit 7 in order to collect the components along x, y, z of each of the three emitted fields. Said switching circuit 7 therefore comprises three inputs for receiving signals delivered respectively by the three coils, one control input and a single output. The corresponding control signal S2 is of the periodic type shown in FIG. 4c and having a period T1/3 in order to switch the coils C1, C2 and C3 successively to the output S3 (FIG. 4d). The complete cycle comprises nine periods of the signal S2 in order to collect the nine components of the successive fields H1, H2 and H3. Each sensor coil is connected three times during a cycle T2. The processing circuit 6 comprises coherent demodulation from the emission signal S0.

The processed signals S4 are transmitted to an ancillary computer 8 such as an airborne computer in order to calculate the angles $\alpha$, $\theta$ and $\phi$.

In accordance with the invention, the receiver comprises a loop formed by a differential comparator 9 in which the coil signal S3 is compared with a reference signal S5 of variable amplitude controlled by the computer. The signal S5 is a wave of the same type as S3 and is produced from the signal S0 applied to a variable-gain amplifying circuit 10. The control circuit formed by the loop operates in such a manner as to reduce to zero the error signal S6 appearing at the output of the comparator and resulting from the difference between S3 and S5, and to deduce therefrom the value of the corresponding component. Reduction of the error S6 to zero is obtained by variation of the gain-control signal S7, this variation being computed by the circuit 8. Taking into account the time distribution at the period T2 of one and the same component (FIGS. 4b and 4d), the computer 8 stores the corresponding corrective values and produces nullification during at least two successive periods T2.

A clearer understanding of the operation will be gained from the more detailed diagram of FIG. 5 which corresponds to one example of embodiment. The same elements or signals as those of FIG. 3 are designated by the same references. The process entails the use of a synchronous demodulating circuit 20, the direct-current output S8 of which corresponds to the amplitude of the rectified and detected error signal S6. This signal is applied to a coherent integrating circuit 21 composed of an integrator 22, connecting switches 23 and 24 and a zero-reset switch 25. The integration output S9 is converted into a digital data item by a converting and coding circuit 27 so as to produce the data item S4 which is transmitted to the computer 8 via a buffer register 28. On the basis of this signal, the computer forms the data item S7 and this latter is applied to the variable-gain circuit constituted by a register 29 and a digital-to-analog multiplier 30 in which the signal S0 is multiplied by the signal S7.

The operation of the loop is as follows in the case of each field component, consideration being given by way of example to the component H11, along the axis x, of the field H1 produced by the coil R1. The corresponding current induced in the coil C1 is received during the period within the range of $t_o$ to $t_o+T1/3$ of a first cycle considered (FIG. 4d) and produced a signal S3. The integrator 22 is reset to zero at the commencement of each period T1/3. After resetting to zero, the switch 23 is closed and the demodulated signal S8 is integrated. Shortly before the end of the period T1/3 considered, the switches 23 and 24 are opened and closed respectively, thus making it possible to code the analog error value at 27. The computer produces a corresponding variation of the information S7 so that the new value multiplied by S0 at 30 may produce the desired compensation.

However, this new value is stored until the following period relating to the same component and starting at the instant $t_0 t_2$. After nullification of the error S6, the value S7 which has been transmitted to the register 29 represents the value of the component H11, allowance being made for a known multiplication factor resulting from the circuit 30 and from the demodulating and integrating chain.

The switch 24 is opened at the end of each period T1/3. By way of indication, the frequency of the oscillator 2 can be of the order of 20 kHz, for example, and the value chosen for the period T1/3 can be approximately twenty cycles of the oscillator wave, which corresponds to 1/100 sec., that is, one hundred measurements per second. The integration time proper is slightly shorter than T1/3, taking into account the times of switching of the circuits 23, 24 and 25 produced at the beginning and at the end of a period T1/3.

The computer 8 generates in digital form the control signals S1 and S2 for the switching or multiplex circuits 3 and 7 to which they are transmitted via registers 32 and 33. The computer also generates a signal S10 which is applied to a variable-gain amplifying circuit 34 via a register 35. It will be understood that the circuit 34 is of the digital control type. This circuit is interposed between the oscillator 2 and the switching circuit 3. The object of these circuits is to compensate for attenuation of the signal which varies in $1/d^3$, where d is the sensor-radiator distance, and consecutively to maintain the signal-to-noise ratio. The signal S10 is generated while taking into account the variations in amplitude exhibited by the successive signals S3 in the course of time, these variations being produced by the displacements of the sensor which is attached to the movable structure. The signals delivered by the switch 3 are amplified to a suitable level by the respective circuits 36, 37 and 38 for the separate excitation of the coils. The circuit 39 within the computer 8 corresponds to a synchronization assembly which generates from the signal S0 the control signals S1 and S2 for the switches 3 and 7 as well as the signals S11, S12 and S13 for the switches 23, 24 and 25.

The method of computation of the Euler angles is as follows: assuming that the coordinate frame x, y, z at M is oriented in the same manner as the reference coordinate frame X, Y, Z, there is obtained by means of the nine field components a first matrix [H i,j] of coefficients resulting from:

HX = h11 I1 + h12 I2 + h13 I3
HY = h21 I1 + h22 I2 + h23 I3
HZ = h31 I1 + h32 I2 + h33 I3 where I1, I2 and I3 are the currents within the coils C1, C2 and C3 and h, i, j are coefficients such that h11 I1 corresponds to the component H11 of h1 (FIG. 2), h12 I2 corresponds to the component H12 of H2, and so on. HX represents the sum of the three successive components along the axis X and the sum $\vec{H} = \vec{HX} + \vec{HY} + \vec{Hz}$ corresponds to the sum $\vec{H1} + \vec{H2} + \vec{H3}$ of the successive fields. Transition from the reference position at M to the real position results from rotations $\alpha$ about Z, $\theta$ about Y and $\phi$ about X (FIG. 1). We may write the corresponding matrix of rotation [R], in which $\alpha$, $\theta$ and $\phi$ are the values to be determined. If [H'i,j] represents the matrix of components after rotation, that is, the components effectively received at the level of the sensor, we have the relation [H'i,j] = [R]·[H i,j]; [H'] being known, it is only necessary to know [H] in order to obtain [R] by calculation.

The matrix [H] is determined by calculation from the information received, especially on the basis of the following considerations:

the components along x, y, z of each field H1, H2, H3 are known and the field moduli can be deduced therefrom;

the direction of H1, H2, H3 depend only on the position M of the sensor in space and more precisely on the direction OM;

each field vector H1, H2 or H3 is in the plane formed by the direction OM between radiator and sensor and the magnetic axis of the excited coil; thus H1 is in the plane OM, OX (FIG. 2);

the angle $\gamma$ made by the field vector at M with the direction OM ($\gamma 1$ in the case of H1, $\gamma 2$ in the case of H2, etc.) is known since the radiation diagram of the radiator coils is known;

said angle $\gamma$ remains the same along the direction OM and depends solely on this direction; if $\delta$ designates the angle made by the direction OM with the corresponding magnetic axis (OX in the case of the field H1), the angle $\gamma$ is the same along all the generator-lines of the cone having a vertex 0 and a semi-vertex angle $\delta$ obtained by rotation of OM about X, on the grounds of symmetry of the field distribution about the magnetic axis;

the angle $\gamma$ can be defined in a simple manner as a function of $\delta$ by assimilating the excited coil with a small-sized loop which can in turn be assimilated with a magnetic doublet; thus we may write: $tg\gamma = \frac{1}{2} tg\delta$ and the components along OM and the perpendicular direction in the plane formed by the field and OM are known as a function of cos $\delta$ and sin $\delta$, allowance being made for a multiplication constant;

the angle $\beta$ made by each field with the plane formed by the other two fields, for example $\vec{H1}$ with the plane $\vec{H2}$, $\vec{H3}$, can be expressed as a function of $\delta$ in accordance with the relation $tg\beta = \frac{2}{3}(tg\delta + (1/tg\delta))$.

There is determined on the basis of the foregoing considerations an algorithm for computing the matrix [H] of the components of $\vec{H1}$, $\vec{H2}$ and $\vec{H3}$ in the radiator reference frame X, Y, Z, from which is deduced the rotation matrix [R] = [H'i,j]·[H$^{-1}$i,j], where [H$^{-1}$] is the inverse matrix [H] and consecutively, the Euler angles $\alpha$, $\theta$ and $\phi$. The determination of this algorithm is outside the scope of the present invention and is not reproduced in detail. If one of the axes of the movable coordinate frame constitutes the direction to be located, identification of its direction is immediate: for example, the axis x is located angularly by means of the values $\alpha$ and $\theta$ with respect to the reference coordinate frame X, Y, Z.

The method of calculation indicated in the foregoing is not to be considered in any limiting sense. Programming of the computer is performed in accordance with known techniques as a function of the computational algorithms to be solved which are in turn a function of the method adopted.

What is claimed is:

1. A device for measuring the relative orientation of two mechanically independent bodies, comprising:
    radiating means for emission of a magnetic field including:

(1) a first assembly of three coils which are adapted to be rigidly fixed to a first body and which are oriented perpendicularly to each other to define a cartesian coordinate frame for the associated body; and
(2) circuit means for supplying said coils comprising:
 (a) an oscillator for delivering an alternating current signal constituted by an unmodulated continuous wave, and
 (b) a first multiplexing circuit for supplying periodically said coils from said oscillator so as to connect separately and successively each of said coils during each emission cycle;
sensing means for receiving said field including:
(1) a second assembly of three coils which are adapted to be rigidly fixed to the second body and which are oriented perpendicular to each other to define a cartesian coordinate frame for the second body,
(2) a processing circuit,
(3) a second multiplexing circuit for connecting said receiving coils separately and successively to said processing circuit, said processing circuit providing coherent demodulation of the signals induced in the receiving coils from the said alternating-current signal,
(4) computing and control means for computing from the demodulated signal orientation information relating to the coordinate frames and for providing control signals to the two multiplexing circuits aforesaid so as to connect the detecting coils separately and successively to the processing circuit during each period of supply of a radiating coil at each emission cycle, said computing and control means including an ancillary computer, the elements of said sensing means defining further a loop for comparing the induced coil signal with a reference signal of variable amplitude controlled by the computing means on the basis of the demodulated signal, so that the comparison result reaches zero, the loop being formed by said processing circuit,
(5) a variable gain circuit supplied with said alternating current signal and controlled by the computing and control means, and
(6) a differential comparator circuit connected to the output of the second multiplexing circuit at a first input and to the output of said variable-gain circuit at a second input, and having an output connected to the input to said processing circuit.

2. A device according to claim 1, wherein the processing circuit comprises, in series, a synchronous demodulator, a coherent integrating circuit, and an analog-to-digital conversion and decoding circuit, and wherein the variable-gain circuit is formed by a digital-to-analog conversion and multiplication circuit for receiving a gain-control digital signal from the computer and the alternating-current signal from the oscillator and for supplying through its output the second input of the differential comparator, and wherein the computing and control means comprise a timing circuit whereby the alternating-current signal is used to generate the signals for controlling multiplexing circuits and control and zero-reset control signals for said coherent integrating circuit.

3. A device according to claim 1, wherein the control and computing means periodically determine the Euler angles defining the orientation of the two coordinate frames by means of the nine successive signals derived from the processing circuit and corresponding to the components of the three successive fields produced at the sensor location by the radiator coils which are excited one after the other during a periodically repeated operating cycle, the components produced in the sensor coordinate frame being defined by means of the signals induced in the sensor coils.

* * * * *